United States Patent
Ulcej (10) Patent No.: US 6,206,680 B1
(45) Date of Patent: Mar. 27, 2001

(54) EXTRUSION DIE MEMBRANE

(75) Inventor: John A. Ulcej, Colfax, WI (US)

(73) Assignee: Extrusion Dies, Inc., Chippewa Falls, WI (US)

( * ) Notice: Subject to any disclaimer, the term of this patent is extended or adjusted under 35 U.S.C. 154(b) by 0 days.

(21) Appl. No.: 09/040,178

(22) Filed: Mar. 17, 1998

(51) Int. Cl.$^7$ .............................. B29C 47/16; B29C 47/92
(52) U.S. Cl. ................................. 425/382.4; 425/192 R; 425/461
(58) Field of Search ........................... 425/141, 190, 425/192 R, 382.4, 381, 465, 466, 461

(56) References Cited

U.S. PATENT DOCUMENTS

| | | |
|---|---|---|
| 2,975,475 | 3/1961 | Heston . |
| 3,377,655 | 4/1968 | Kucharski et al. . |
| 3,850,568 | 11/1974 | Bartha et al. ............... 425/466 |
| 3,884,611 | 5/1975 | Anderson et al. . |
| 4,055,389 | 10/1977 | Hayward ................... 425/466 |
| 4,293,517 | 10/1981 | Knox . |
| 4,372,739 | 2/1983 | Vetter et al. ............... 425/466 |
| 4,411,614 | 10/1983 | Feathers ..................... 425/466 |
| 4,521,359 | 6/1985 | Tsien . |
| 4,533,308 | 8/1985 | Cloeren .................. 425/131.1 |
| 4,619,802 | 10/1986 | Cloeren . |
| 4,695,236 | 9/1987 | Predöhl et al. ........... 425/131.1 |
| 4,778,367 | 10/1988 | Hilakos ....................... 425/113 |
| 4,861,536 | 8/1989 | Graf et al. . |
| 4,892,473 | 1/1990 | Elia et al. ................. 425/197 |
| 4,922,192 | 5/1990 | Gross et al. . |
| 4,990,079 | 2/1991 | Lorenz ....................... 425/141 |
| 5,066,435 | 11/1991 | Lorenz et al. ............. 264/40.5 |
| 5,067,432 | 11/1991 | Lippert . |
| 5,094,792 | 3/1992 | Baran . |
| 5,149,481 | 9/1992 | Gross et al. . |
| 5,242,742 | 9/1993 | Funk et al. . |
| 5,256,052 | 10/1993 | Cloeren ................... 425/133.5 |
| 5,273,420 | 12/1993 | Gross et al. ............... 425/382.4 |
| 5,275,547 | 1/1994 | Brown ....................... 425/129.1 |
| 5,286,436 | 2/1994 | Funk et al. ................ 264/210.2 |

(List continued on next page.)

FOREIGN PATENT DOCUMENTS

| | | |
|---|---|---|
| 2032257 | 6/1991 | (CA) . |
| 2054889 | 5/1992 | (CA) . |
| 11 25 146 | 3/1962 | (DE) . |
| 44 00 069 | 4/1995 | (DE) . |
| 295 14 043 U | 11/1995 | (DE) . |
| 195 35 930 | 1/1997 | (DE) . |
| 0 484 721 | 5/1992 | (EP) . |
| 59-114027 | * 6/1984 | (JP) . |
| 95/18711 | 7/1995 | (WO) . |
| WO 98/57792 | 12/1998 | (WO) . |

OTHER PUBLICATIONS

Patent Abstract of Japan, vol. 008, No. 234 (M–334), Oct. 26, 1984 and JP 59 114027 A (Mitsubishi Jukogyo KK), Jun. 30, 1984.

*Primary Examiner*—Harold Pyon
*Assistant Examiner*—Joseph Leyson
(74) *Attorney, Agent, or Firm*—Marshall, O'Toole, Gerstein, Murray & Borun (57) ABSTRACT

A flexible membrane is attached to a holder for controlling flow in an extrusion die. The membrane includes a horizontal portion, first and second curved portions adjacent the horizontal portion, first and second offset portions adjacent the first and second curved portions, and first and second edges adjacent the first and second offset portions. The membrane is formed of a single piece of material. The flow control device including the flexible membrane may be produced by fabricating a membrane holder from a material, fabricating a flexible membrane from the same material, joining the flexible membrane to the membrane holder, and hardening the membrane holder and membrane.

13 Claims, 8 Drawing Sheets

U.S. PATENT DOCUMENTS

| | | | |
|---|---|---|---|
| 5,401,454 | 3/1995 | Mendel | 264/176.1 |
| 5,460,761 | 10/1995 | Larsson | 264/39 |
| 5,494,429 | 2/1996 | Wilson et al. | 425/192 R |
| 5,512,237 | 4/1996 | Stigenberg | 420/49 |
| 5,516,273 | 5/1996 | Delmore et al. | 425/192 R |
| 5,516,474 | 5/1996 | Cloeren | 264/171.23 |
| 5,529,730 | 6/1996 | Gross | 264/40.1 |
| 5,542,836 | 8/1996 | Gross et al. | 425/141 |
| 5,587,184 | 12/1996 | Leonard et al. | 425/133.5 |
| 5,608,637 | 3/1997 | Wang et al. | 364/468.03 |
| 5,626,888 | 5/1997 | Sänze et al. | 425/141 |
| 5,788,998 * | 8/1998 | Gross | 425/382.4 |

* cited by examiner

EXTRUSION DIE MEMBRANE

FIELD OF THE INVENTION

The present invention relates generally to extrusion dies, and more particularly to apparatus for controlling material flow through the die.

BACKGROUND ART

Extrusion processes have long been used to produce sheets or webs of formable material, such as thermoplastic. These processes generally involve forcing a viscous material through a die typically comprising an inlet, a cavity, and an exit. As the material passes through the die, it is often necessary to influence the flow to obtain a product at the die exit having desirable characteristics.

Past methods of influencing material flow have included the use of a flow control device mounted in a channel within a die cavity, such as a restrictor bar, a flexible membrane, or another insert. Since most extrusion processes operate under high pressure, leakage of material into spaces between the insert and the channel is a significant concern. Build-up of material in the channel can prevent proper flow control and result in burning of material therein. Hence, the channel and insert must be designed and machined to tolerances that will ensure a tight sealing fit and thereby prevent leakage.

The assignee of the instant application currently offers for sale a die having a flexible membrane mounted by spaced mounting members in correspondingly-shaped tapered channels in the die cavity. Bolts extend into the mounting members and are tightened to cause the members to seal against walls forming the tapered channel. End surfaces of the membrane are clamped between body members of the die to form a seal between the die and the membrane.

While this arrangement of elements is effective to accomplish flow control, some drawbacks are encountered. Specifically, the installation process is complicated and expensive. Further, machining of the tapered channels is difficult to accomplish with the required degree of precision and is not well suited (due to the channel configuration) to large-scale production techniques. In addition, re-working of such a die would likely result in a substantial amount of refitting of the flow control device in the channels. Manufacture of an aftermarket flow control device without the original tooling would also be problematic. Furthermore, clamping the end surfaces of the membrane can restrict adjustment of the membrane which, in turn, can make it more difficult to achieve a desired flow control.

SUMMARY OF THE INVENTION

According to one aspect of the present invention, a flexible membrane for an extrusion die is provided. The membrane includes a horizontal portion, first and second curved portions adjacent the horizontal portion, a first offset portion adjacent the first curved portion, and a second offset portion adjacent the second curved portion. The membrane also includes a first edge adjacent the first offset portion, opposite the first curved portion, and a second edge adjacent the second offset portion, opposite the second curved portion. The membrane is formed of a single piece of material.

According to another aspect of the present invention, a method of producing a flow control device for an extrusion die is provided. The method includes the steps of fabricating a membrane holder from a material, fabricating a flexible membrane from the same material, joining the flexible membrane to the membrane holder, and hardening the membrane holder and membrane.

Other advantages of the invention will be apparent to those skilled in the art from the following detailed description taken in conjunction with the drawings and the appended claims.

DETAILED DESCRIPTION OF THE INVENTION

Figure 1:
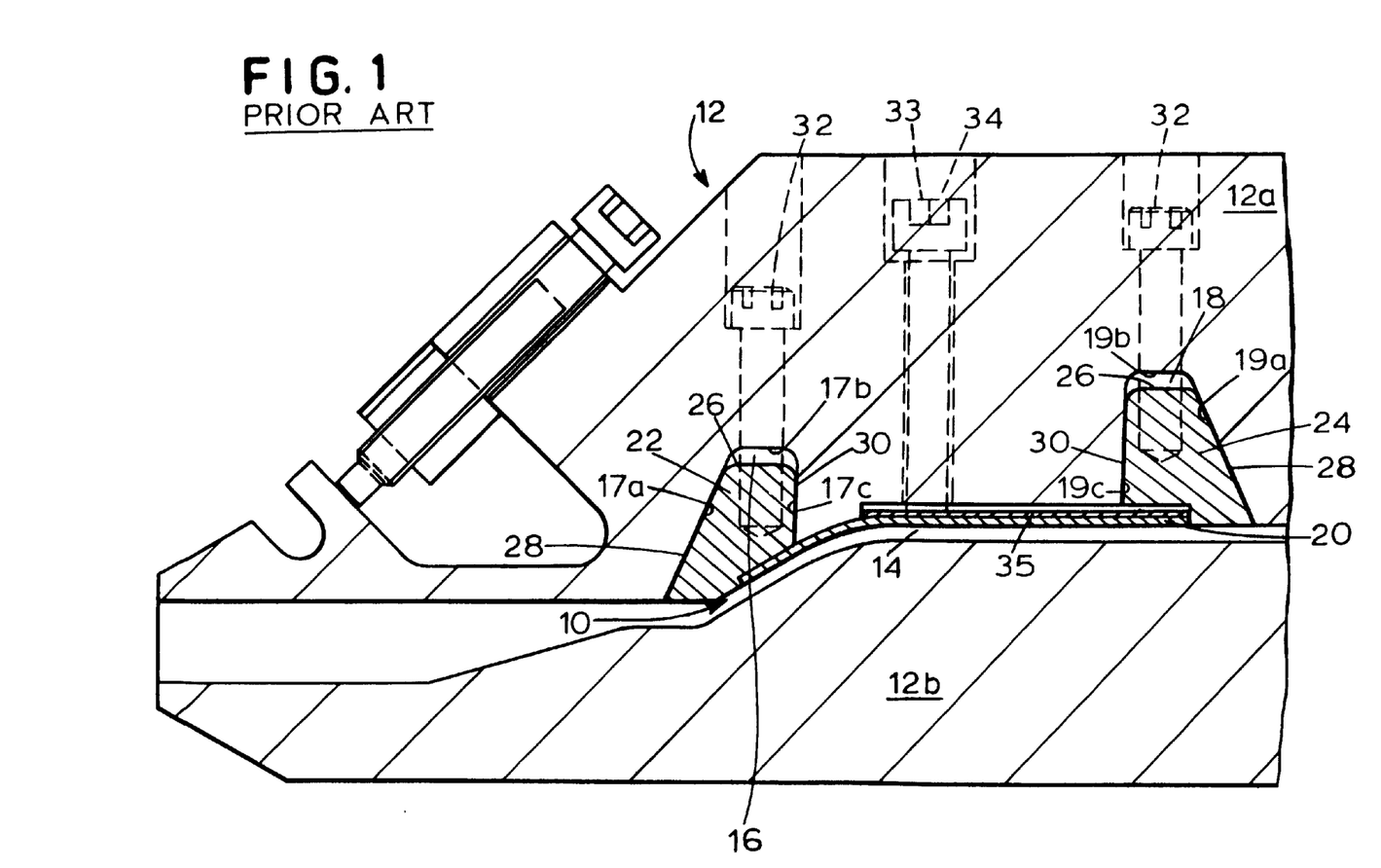
FIG. 1 comprises a cross-sectional view of a prior art flow control device disposed within a die.

Referring now to the drawings, wherein like reference numerals designate identical or corresponding parts throughout the several views, and more particularly to FIG. 1 thereof, a prior art flow control device 10 is disposed within an extrusion die 12. The flow control device 10 is disposed within a die cavity 14 having a first tapered channel 16 and a second tapered channel 18. In the device illustrated in FIG. 1, sidewalls 17a, 19a in part defining the channels 16, 18 are disposed at angles of other than 90° with respect to base surfaces 17b, 19b, respectively. The flow control device 10 comprises a flexible membrane 20, a first mounting member 22, and a second mounting member 24. The flexible membrane 20 is disposed between and joined to the mounting members 22, 24.

Furthermore, the flexible membrane 20 is movable in a direction perpendicular to the direction of flow and has end surfaces (not shown) that extend beyond the mounting members 22, 24.

Each of the mounting members 22, 24 includes a base 26 and two sides 28, 30 adjacent the base 26. The two sides 28, 30 of the mounting member 22 are complementarily-shaped with respect to the sidewall 17a and a sidewall 17c forming the channel 16. Similarly, the two sides 28, 30 of the mounting member 24 are complementarily-shaped with respect to the sidewall 19a and a sidewall 19c forming the channel 18. Bolts 32 extending through bores in the die and into the mounting members 22, 24 secure the flow control device 10 within the tapered channels 16, 18. One or more additional bolts 33 extend through threaded bores 34 in the die and push against a stiffener plate 35 which is disposed in contact with a back surface of the membrane 20. The stiffener plate 35 is provided to permit adjustment of the position of the flexible membrane 20 according to the desired flow characteristics and end product. The end surfaces of the flexible membrane 20 are clamped between upper and lower body members 12a, 12b, of the die 12 to form a seal between the die 12 and the flexible membrane 20.

As discussed above, disadvantages are encountered with the design of the flow control device 10 shown in FIG. 1 including the production, re-working, and aftermarket design problems noted above.

Shown in FIGS. 2 through 7 is one embodiment of a mounting apparatus according to the present invention which overcomes the problems encountered with the prior art flow control device 10 of FIG. 1. With specific reference to FIGS. 2 through 4, a flow control device 40 is disposed within a die cavity 42 of a flow handling apparatus, shown here as an extrusion die 44. The flow control device 40 is disposed within a channel 46 defined by a base surface 48, a first side surface 50, and a second side surface 52. Each of the side surfaces 50, 52 is normal to the base surface 48.

Figure 2:
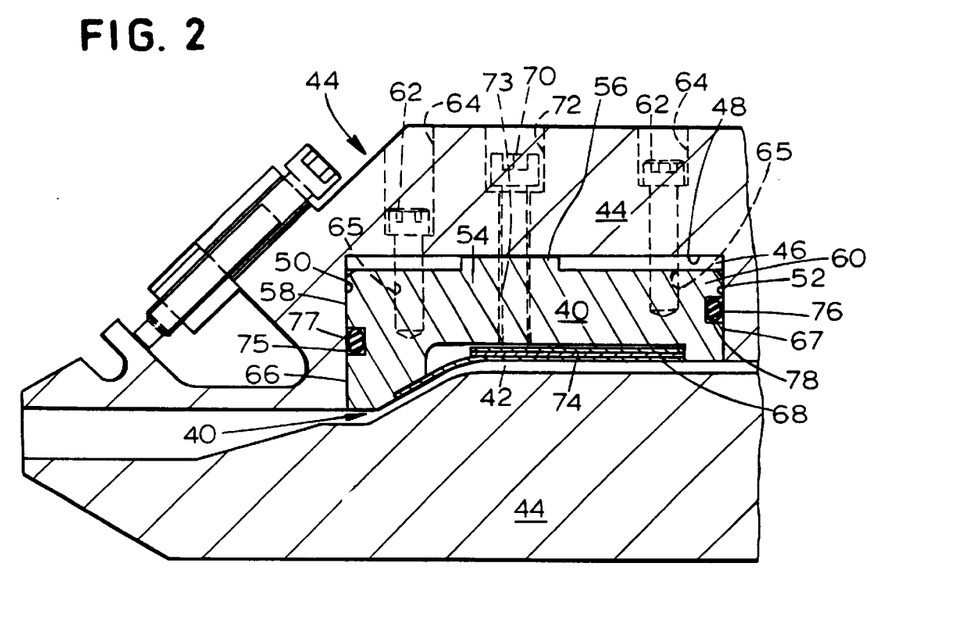
FIG. 2 comprises a cross-sectional view of a flow control device disposed within a die cavity according to the present invention.
Figure 3:
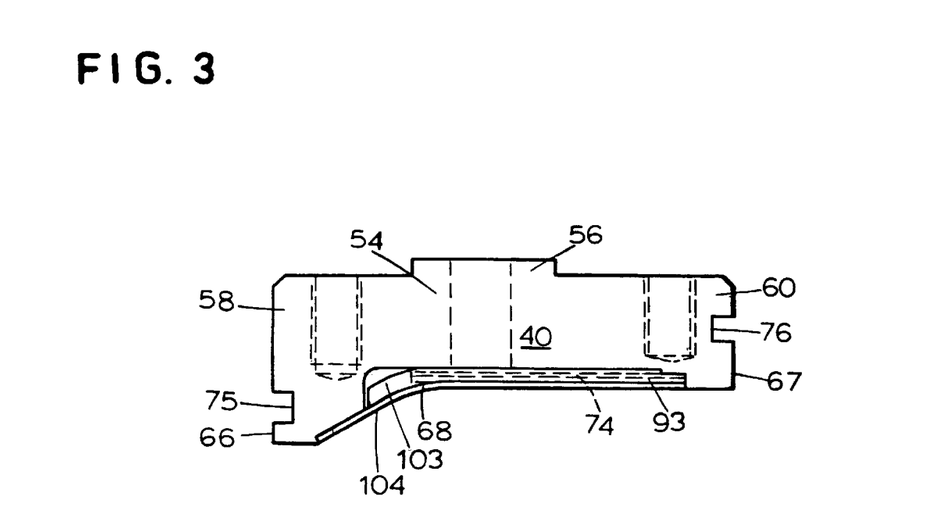
FIG. 3 comprises an enlarged end elevational view of the flow control device of FIG. 2.
Figure 4:
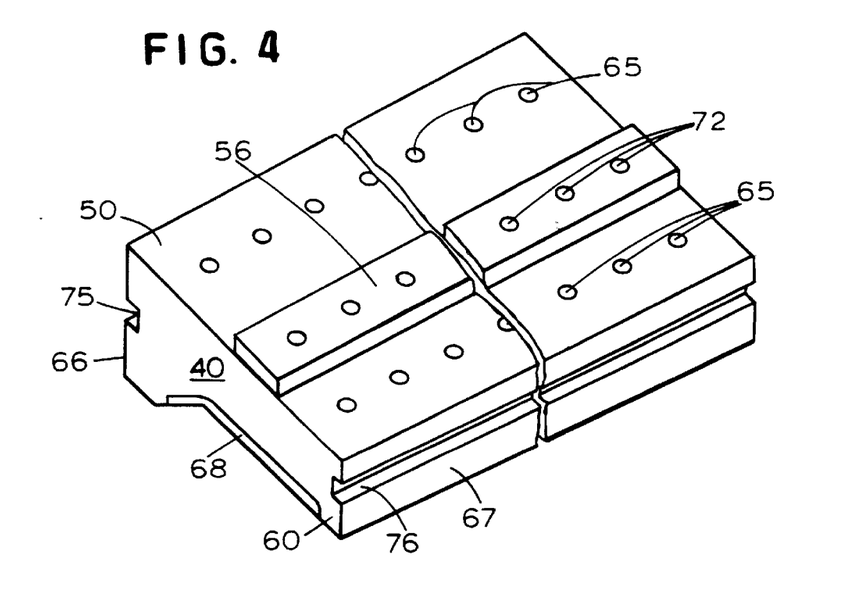
FIG. 4 comprises a perspective view of the flow control device of FIG. 2.

The flow control device 40 has a main body 54 and an auxiliary body 56 joined to and extending away from the main body 54. The main body includes a first side portion 58 and a second side portion 60. When disposed in the channel 46, the auxiliary body 56 extends into contact with the base surface 48 of the channel 46. Furthermore, the first side portion 58 is adjacent to the first side surface 50 and the second side portion 60 is adjacent to the second side surface 52.

The flow control device 40 is held in place in the channel 46 by force-transmitting members 62 which may be bolts, screws or other fasteners. The force-transmitting members 62 are disposed in bores 64 in the extrusion die 44 and further extend into threaded bores 65 in the side portions 58, 60 of the flow control device 40. Typically, the spacing between the force-transmitting members 62 is between about 0.75 inches and about 2.5 inches.

The flow control device 40 further includes a flexible membrane 68 joined to and disposed between each of the side portions 58, 60 on a face opposite the auxiliary body 56. In a first embodiment, the membrane 68 is welded or otherwise joined to the main body 54. A number of force transmitting members 70, which may be threaded bolts, screws, or other fasteners, are disposed in bores 72 in the die 44 and extend through threaded portions 73 and push against at least one, and preferably two (or more) stiffener plates 74. The stiffener plates 74 in turn serve as a rigid member or support for the flexible membrane 68. The force transmitting members 70 may be threaded into or out of the threaded portions 73 to change the profile of the membrane 68 and, thus, change the flow of material in the die cavity 42. For example, when one or more of the force transmitting members 70 is (or are) threaded into the threaded portions 73, the stiffener plates 74 move the membrane 68 into the flow of material through the die cavity 42. Typically, the spacing between the force-transmitting members 70 is between about 0.75 inches and about 2.5 inches.

Each of the side portions 58, 60 further includes a sealing surface 66, 67, respectively, and a channel 75, 76, respectively, in which a sealing element 77, 78 may be disposed. The sealing element 77, 78 preferably is constructed of a formable material capable of operation in a hot and corrosive environment, such as a metal- or carbon impregnated Teflon™ material or a metal material.

Figure 5:
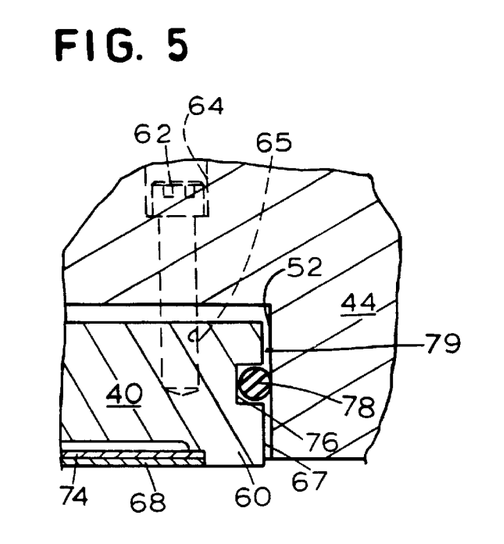
FIGS. 5 and 6 are fragmentary, enlarged, cross-sectional views illustrating the installation of the flow control device of FIG. 2.

As shown in FIG. 5, before the members 62 are threaded into the bores 65 to exert forces on the side portions 58, 60, a gap 79 exists between the side portions 58, 60 and the side surface 50, 52. (This gap is shown in exaggerated fashion in FIG. 5 for the sake of explanation.)

Figure 6:
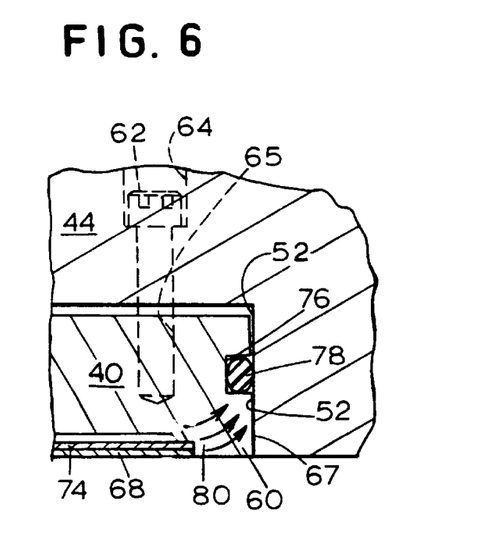

However, as seen in FIG. 6, when the members 62 are threaded into the bores 65, bending moments are introduced in the side portions 58, 60, causing such portions to deflect about the auxiliary body 56 (which is in contact with the base surface 48, as noted previously). Arrows 80 shown in FIG. 6 illustrate the movement of the side portion 60 during tightening of the members 62. This movement eventually causes each sealing surface 66, 67 to contact each side surface 50, 52, respectively, over areas of the surfaces 50, 52, 66, 67. Further, each sealing element 77, 78 is compressed within each channel 75, 76 and bears against the side surface 50, 52, respectively. Thus, a tight seal forms between the side portions 58, 60 and the side surfaces 50, 52 to prevent leakage into the space between the main body 54 and the channel 46.

Figure 7:
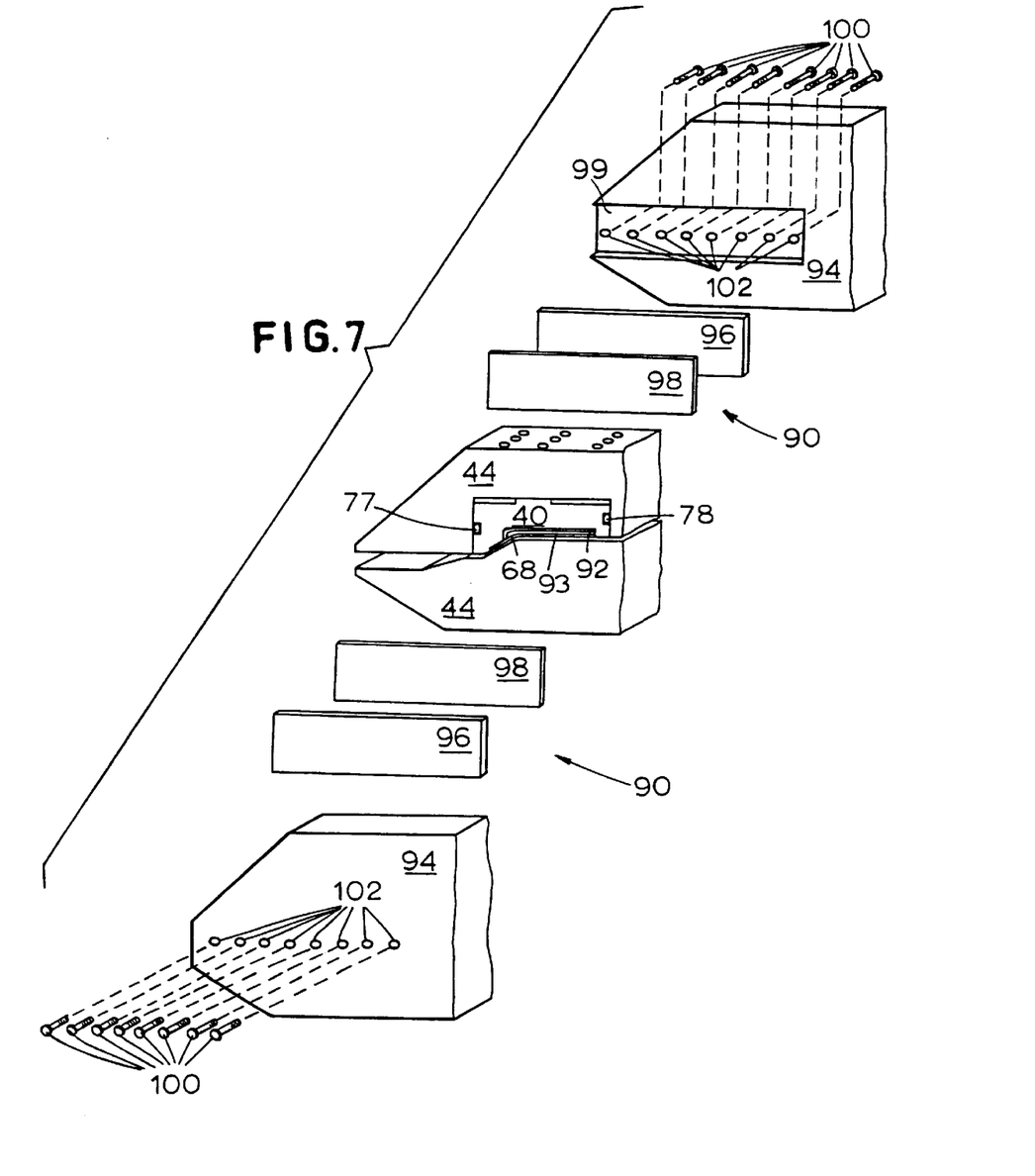
FIG. 7 comprises an exploded perspective view of a sealing apparatus for the flow control device of FIGS. 2–6.

Shown in FIG. 7 is the flow control device 40 disposed within the die 44 and a sealing apparatus 90 disposed adjacent end portions 92 of the flow control device 40 and the die 44. The sealing apparatus 90 forms a tight seal between a built-up portion 93 of the flexible membrane 68 and end plates 94 of the die 44. Each sealing apparatus 90 includes one or more backing plates 96 and a gasket 98 disposed in side-by-side relationship in a recess 99 in each end plate 94. The gasket 98 is made of any suitable material capable of withstanding the die environment. One or more force transmitting members 100, which may be threaded bolts or screws, are disposed in bores 102 in the end plate 94 and push against the backing plate 96. The backing plate 96, in turn, pushes against the gasket 98 and causes the gasket 98 to seal against the built-up portions 93 of the flexible membrane 68. The force causing the gasket 98 to move is preferably directed transversely to the direction of movement of the flexible membrane 98.

Preferably, as seen in FIG. 3, each built-up portion may comprise a curved member 103 which is preferably (although not necessarily) rectangular in cross-section and which is welded or otherwise joined to or formed with the membrane 68 contiguous with an edge 104 of the membrane 68. Also preferably, each curved member 103 is sufficiently thin and narrow to permit adequate adjustability of the membrane 68, and further has a coefficient of thermal expansion (CTE) similar or identical to the CTE of the membrane 68. The curved members 103 present flat sealing surfaces to the gaskets 98 so that the gaskets 98 are not damaged by the thin edges of the membrane 68 and so that the ends of the membrane 68 can slide over the gaskets 68 during profile adjustment.

The sealing apparatus 90 prevents leakage of material between the die 44 and the flexible membrane 68. Furthermore, this sealing arrangement does not significantly restrict the movement and adjustment of the flexible membrane 68 and, thus, does not significantly interfere with the ability to influence material flow past the flow control device 40.

Figure 8:
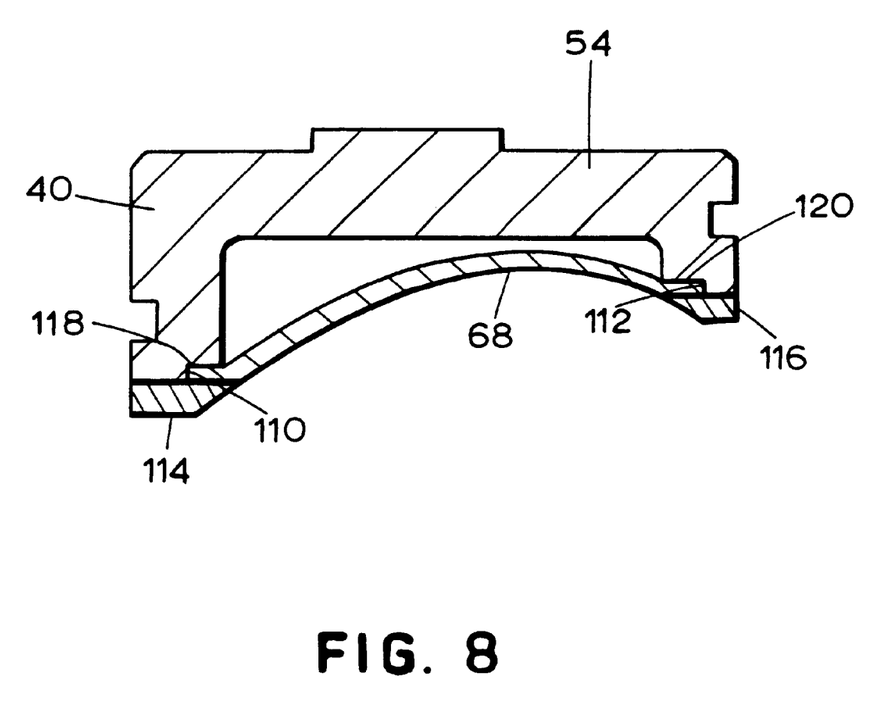
FIG. 8 comprises a cross-sectional view of a further embodiment of a flow control device according to the present invention.

As seen in FIG. 8, the membrane 68 can be retained within opposed slots 110, 112 in the flow control device 40. The slots may be formed by cap members 114, 116 which are held in position overlying channeled portions 118, 120 of the main body 54 by bolts or other fasteners (not shown).

Alternatively, the cap members 114, 116 may be welded to the main body 54.

Dimensions for the flow control device 40 and the sealing apparatus of the present invention will vary depending on the flow characteristics of the material flowing through the die cavity 42 and the various process parameters.

In summary, the flow control device 40 of the present invention is an improvement over the above-described prior art device 10. Specifically, the flow control device 40, unlike the prior art device 10, is not tapered, and hence is more easily manufactured to the required degree of precision. Additionally, manufacturing tolerances can be relaxed as compared with the prior art device 10 because a range of gap dimensions can be eliminated by the movement of the side portions 58, 60 into engagement with the side surfaces 50, 52. Furthermore, installation of the device 40 is simplified and cheaper since it is easier to machine the channel 46 owing to the fact that it has non-tapered sidewalls. Still further, manufacture of an aftermarket flow control device without the original tooling is no longer a problem. Additionally, the sealing apparatus does not significantly restrict movement of the flexible membrane and, thus, does not interfere with flow control.

Referring now to FIGS. 9–12, which show another embodiment of the invention, a flow control device 210 is disposed within a die cavity 212 of a flow handling apparatus, shown here as an extrusion die 214. Although not described in detail below, and not shown in detail in FIGS. 9–12, the embodiment shown in FIGS. 9–12 includes a side sealing apparatus similar to that shown in FIGS. 4 and 7. The flow control device 210 is disposed within a channel 216 defined by a base surface 218, a first side surface 220, and a second side surface 222 Each of the side surfaces 220, 222 is normal to the base surface 218.

Figure 9:
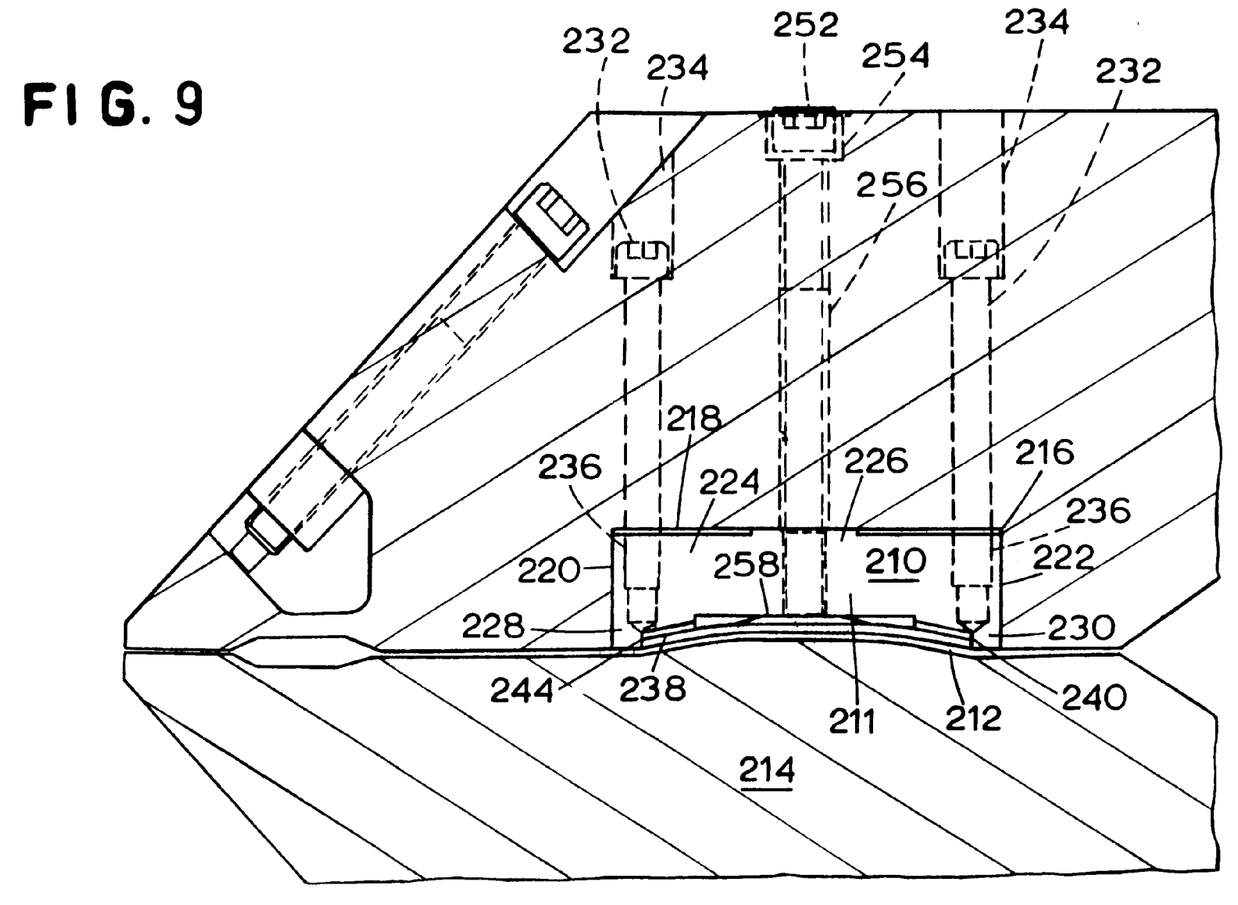
FIG. 9 comprises a cross-sectional view of a flow control device disposed within a die cavity according to yet another embodiment of the present invention.

The flow control device 210 includes a flexible membrane 238 and a membrane holder 211. The holder 211 has a main body 224 and an auxiliary body 226 joined to and extending away from the main body 224 The main body 224 includes a first side portion 228 and a second side portion 230. When disposed in the channel 216, the auxiliary body 226 extends into contact with the base surface 218 of the channel 216. Furthermore, the first side portion 228 is adjacent to the first side surface 220 and the second side portion 230 is adjacent to the second side surface 222.

The flow control device 210 is held in place in the channel 216 by force-transmitting members 232 which may be bolts, screws, or other fasteners. The force-transmitting members 232 are disposed in bores 234 in the extrusion die 214 and further extend into threaded bores 236 in the side portions 228, 230 of the main body 224. Typically, the spacing between the force-transmitting members 232 is between about 0.75 inches and about 2.5 inches. As in the embodiment of FIGS. 2–8, the force-transmitting members 232 are tightened to bend the side portions 228, 230 of the main body 224 into sealing contact with the side surfaces 220, 222. Sealing elements (not shown) similar or identical to the sealing elements 77, 78 may be provided in channels (also not shown) similar or identical to the channels 75, 76 to assist in sealing, if desired.

Figure 10:
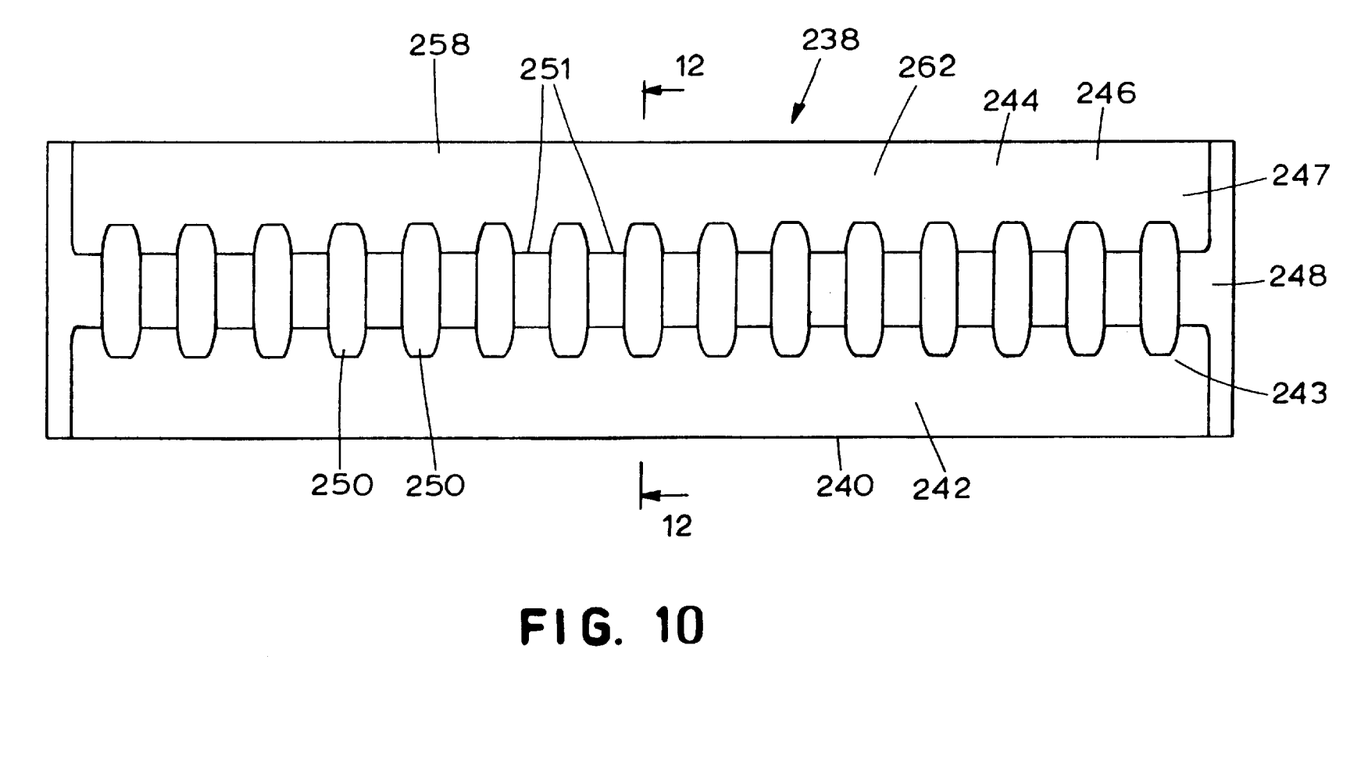
FIG. 10 comprises a plan view of an extrusion die membrane of the flow control device of FIG. 9.
Figure 11:
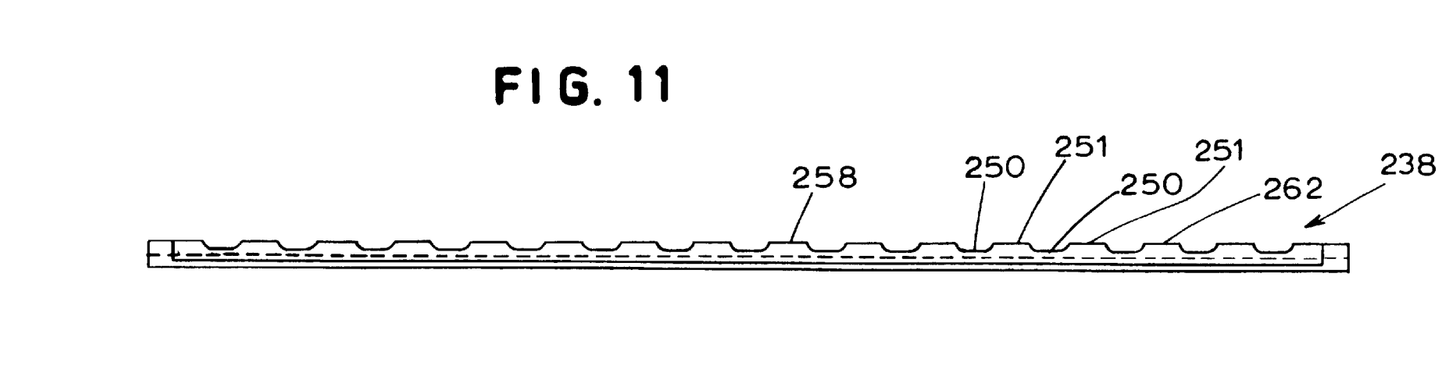
FIG. 11 comprises a side elevational view of the extrusion die membrane of FIG. 10.
Figure 12:
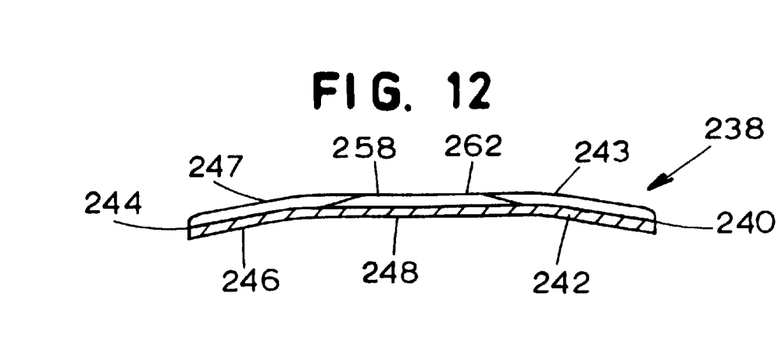
FIG. 12 comprises a cross-sectional view of the extrusion die membrane taken generally along the lines 12—12 of FIG. 10.

The flexible membrane 238 is joined to and disposed between each of the side portions 228, 230 on a face opposite the auxiliary body 226. In the embodiment of FIGS. 9–12, the membrane 238 is welded or otherwise joined to the main body 224. As shown in FIGS. 10–12, the flexible membrane 238 includes a horizontal portion 248, a first curved portion 243 adjacent the horizontal portion 248, and a second curved portion 247 adjacent the horizontal portion 248 opposite the first curved portion 243. The curved portions 243, 247 typically have radii of curvature of about 1 inch to about 3 inches. In a preferred embodiment, each radius of curvature is about 2½ inches. The membrane 238 also includes a first offset (or inclined) portion 242 adjacent the first curved portion 243 and a second offset (or inclined) portion 246 adjacent the second curved portion 247. The first and second offset portions 242, 246 terminate at first and second edges 240, 244. Typically, the offset portions 242 and 246 are offset from the horizontal portion 248 by an angle of between about 5 degrees and about 15 degrees. In a preferred embodiment the offset angle is about 10 degrees. As seen in FIGS. 11 and 12, the horizontal portion 248 includes a plurality of evenly-spaced, substantially flat-bottomed grooves 250 disposed between land portions 251. The flat-bottomed grooves 250 are positioned to allow more flexibility across the die cavity 212. Typically, the grooves 250 are spaced apart by about ½ inch to about 1½ inches. Preferably, the spacing is about ¾ inches. The horizontal portion 248 has an effective adjustment length parallel to the flow of extrudate through the die preferably between about 1 inch and about 1½ inches. In a highly preferred embodiment, this length is about 1¼ inches. This length allows greater adjustability of the flow of extrudate through the die, compared to other dies having a shorter effective adjustment length.

As shown in FIG. 9, a number of force transmitting members 252, which may be threaded bolts, screws, or other fasteners, are disposed in bores 254 in the die 214 and extend through threaded portions 256 and push against the top surface 258 of the membrane 238. The force transmitting members 252 may be threaded into or out of the threaded portions 256 to bear against the land portions 251 and change the profile of the membrane 238 and, thus, change the flow of material in the die cavity 212. For example, when one or more of the force transmitting members 252 is (or are) threaded into the threaded portions 256, the membrane 238 is deflected into the flow of material through the die cavity 212. Typically, the spacing between the force-transmitting members 252 (and the spacing between centers of the land portions 251) is between about 0.75 inches and about 2.5 inches. In a preferred embodiment of the invention, as shown in FIG. 9, the edges 240, 244 of the membrane are located substantially on the same line between the die entrance and die exit. This membrane design allows the extruded material to enter and exit the extrusion die land channel in substantially coplanar fashion, i.e., at the same level when the die is oriented as shown in FIG. 9.

The membrane 238 preferably comprises a single piece of material. For example, the membrane may be machined from a solid piece of stainless steel, such as 400 series stainless steel. Further, in a preferred embodiment both the membrane 238 and holder 211 are formed from the same material. After the membrane 238 and holder 211 are fabricated, the membrane and holder are preferably joined together by welding and then hardened simultaneously by a heat-treatment process. By fabricating and preparing the membrane 238 and holder 211 in this manner, the membrane 238 and holder 211 will have the same coefficient of thermal expansion. Consequently, the weld holding these parts together will not be weakened by differential thermal expansion as the membrane and holder increase in temperature during use. Separate stiffener plates 35 are not required for this embodiment because the membrane 238 has a stiffened area 262 integrally included in the membrane 238, as shown in FIGS. 10–12. Accordingly, the stiffened area 262 is machined in the desired location of the membrane 238, in contrast to other designs that limit the stiffened area to the area between adjustment screws, along with the area under the screws.

In a preferred embodiment, the holder 211 and membrane 238 are fabricated from 400 series stainless steel, such as Carpenter Custom 455® stainless steel, which is a martensitic age-hardenable stainless steel. Specifically, Carpenter Custom 455® stainless steel in condition H 900 has been found suitable for the present invention. For this particular steel, high strength levels are achieved by employing a precipitation-hardening treatment consisting of the steps of heating the steel to a selected temperature between 900° F. and 1050° F., holding the steel at the selected temperature for four hours, and air cooling the steel.

Dimensions for the membrane 238 and holder 211 of the present invention will vary depending on the flow characteristics of the material flowing through the die cavity 212 and the various process parameters.

The foregoing description is given for clearness of understanding only, and no unnecessary limitations should be understood therefrom, as modifications within the scope of the invention will be apparent to those skilled in the art.

What is claimed is:

1. An extrusion die including a discharge opening and a membrane disposed upstream of and spaced from the discharge opening, the membrane comprising:

a horizontal portion;

first and second curved portions adjacent the horizontal portion;

a first offset portion adjacent the first curved portion;

a second offset portion adjacent the second curved portion;

a first edge adjacent the first offset portion, opposite the first curved portion; and a second edge adjacent the second offset portion, opposite the second curved portion;

wherein the membrane is formed of a single piece of material and wherein the first and second offset portions are inclined to allow an extrusion material to enter and exit an extrusion die channel in a substantially coplanar fashion.

2. The die of claim 1, further including a holder wherein the membrane is retained by the holder.

3. The die of claim 2, wherein the membrane and holder are formed of the same material.

4. The die of claim 2, wherein the membrane and holder have substantially equal coefficients of thermal expansion.

5. The die of claim 1, wherein the membrane material comprises steel.

6. The die of claim 1, wherein the membrane material comprises 400 series stainless steel.

7. The die of claim 1, wherein the horizontal portion of the membrane includes one or more grooves.

8. The die of claim 1, wherein the first and second offset portions of the membrane are offset from the horizontal portion by an angle of about 5 degrees to about 15 degrees.

9. The die of claim 8, wherein the first and second offset portions are offset from the horizontal portion by an angle of about 10 degrees.

10. The die of claim 1, wherein the first and second curved portions of the membrane have radii of curvature of about 1 inch to about 3 inches.

11. The die of claim 10, wherein the first and second curved portions have radii of curvature of about 2½ inches.

12. The die of claim 1, wherein the horizontal portion of the membrane has a length of between about 1 inch and about 1½ inches.

13. The die of claim 12, wherein the horizontal portion has a length of about 1¼ inches.

* * * * *